(12) United States Patent
Crass et al.

(10) Patent No.: US 8,474,595 B2
(45) Date of Patent: Jul. 2, 2013

(54) BAGGAGE SCREENING DEVICE

(71) Applicant: Smiths Heimann GmbH, Wiesbaden (DE)

(72) Inventors: Matthias Crass, Griesheim (DE); Sebastian Haak, Frankfurt (DE)

(73) Assignee: Smiths Heimann GmbH, Wiesbaden (DE)

( * ) Notice: Subject to any disclaimer, the term of this patent is extended or adjusted under 35 U.S.C. 154(b) by 0 days.

(21) Appl. No.: 13/740,640

(22) Filed: Jan. 14, 2013

(65) Prior Publication Data

US 2013/0126303 A1  May 23, 2013

Related U.S. Application Data

(63) Continuation of application No. PCT/EP2011/002457, filed on May 18, 2011.

(30) Foreign Application Priority Data

Jul. 12, 2010  (DE) .......................... 10 2010 026 940

(51) Int. Cl.
*B65G 37/00*  (2006.01)

(52) U.S. Cl.
USPC .......................................... 198/358; 198/580

(58) Field of Classification Search
USPC ......... 198/347.1, 358, 348, 349, 351, 370.03, 198/369.1, 580
See application file for complete search history.

(56) References Cited

U.S. PATENT DOCUMENTS

| | | | |
|---|---|---|---|
| 6,507,278 B1* | 1/2003 | Brunetti et al. | 340/541 |
| 7,270,227 B2* | 9/2007 | Bender et al. | 198/358 |
| 7,575,112 B2* | 8/2009 | Lowes et al. | 198/358 |
| 7,686,154 B2 | 3/2010 | Henkel et al. | |
| 7,954,627 B2* | 6/2011 | Weed et al. | 198/580 |
| 2003/0128806 A1* | 7/2003 | Morrell | 378/57 |
| 2005/0193648 A1 | 9/2005 | Klein et al. | |
| 2007/0029165 A1* | 2/2007 | Bender et al. | 198/358 |

FOREIGN PATENT DOCUMENTS

| | | |
|---|---|---|
| DE | 200 97 970 U1 | 3/2001 |
| EP | 0 787 668 A2 | 8/1997 |
| EP | 1 151 919 A1 | 11/2001 |
| WO | WO 2007/090450 A1 | 8/2007 |

* cited by examiner

*Primary Examiner* — James R Bidwell
(74) *Attorney, Agent, or Firm* — Muncy, Geissler, Olds & Lowe, PLLC

(57) ABSTRACT

A system for screening carry-on baggage and other items carried by individuals is provided that includes a screening device, especially an X-ray screening device, a conveyor for conveying the items to be screened through the screening device, a support surface arranged upstream of the conveyor, a removal position for the items, arranged downstream of the conveyor, transport trays that are to be placed on the conveyor and in which small objects and items of clothing can be placed and conveyed through the screening device for screening, and a return conveyor for the empty transport trays. The return conveyor leads to a tray lift, the exit of which leads to a tray transfer path extending in parallel to the support surface, the transfer path tapering towards the support surface.

10 Claims, 4 Drawing Sheets

BAGGAGE SCREENING DEVICE

This nonprovisional application is a continuation of International Application No. PCT/EP2011/002457, which was filed on May 18, 2011, and which claims priority to German Patent Application No. DE 10 2010 026 940.9, which was filed in Germany on Jul. 12, 2010, and which are both herein incorporated by reference.

BACKGROUND OF THE INVENTION

1. Field of the Invention

The invention relates to a system for screening carry-on baggage and other items carried by persons comprising a screening unit, especially an x-ray screening unit, a conveyor, extending through the screening unit, for conveying the items to be screened through the screening unit, a support surface arranged upstream of the conveyor and an item retrieval point, arranged downstream of the conveyor, transport trays, which can be placed on the conveyor and in which small items and articles of clothing are placed and conveyed for inspection through the screening unit, and a return conveyor for the transport trays.

2. Description of the Background Art

As is generally known, security checks of carry-on baggage and other items carried by persons, for example, security checks at airports, employ screening systems with x-ray screening units, which x-ray the carried items. The items to be screened are conveyed on a conveyor, typically a conveyor belt, through the screening unit run by an operator. A support surface, which is typically made as a roller conveyor, for the items to be screened is arranged at the entry side upstream of the conveyor. Accordingly, a retrieval point where the screened items can be retrieved is arranged at the exit side downstream of the screening unit. As is generally known, a slightly sloping roller conveyor, on which the screened items move by themselves to the retrieval point or can easily be moved manually, leads from the conveyor to the retrieval point.

As is generally known, to transport small items (wallets, cell phones, laptops, small backpacks, etc.) and articles of clothing, transport trays are used in which these items are placed. Like larger items (handbags, trolleys, etc.), the transport trays with the items therein are placed on the support surface, transferred to the conveyor, and conveyed by it through the screening unit. After the inspection, the screened and non-suspicious items are removed from the trays at the retrieval point by the passengers. After being emptied, the transport trays are again brought back to the entrance of the screening system.

To reduce the burden on operating personnel by the return transport of the trays, it is known from WO 2007/090450 A1, which is incorporated herein by reference, to arrange a return conveyor for the transport trays next to or below the conveyor passing through the screening unit, said return conveyor which extends from the retrieval area to the start area. The return conveyor is arranged to run next to the conveyor, passing through the screening unit, on the operator side. According to another embodiment, the return conveyor is arranged below the screening unit. The trays are conveyed back lying on the return conveyor or in an upright position and are taken by a passenger from the return conveyor to the start area.

SUMMARY OF THE INVENTION

It is therefore an object of the present invention to improve a baggage screening system of the generic type such that the burden on passengers and operating personnel is reduced during the use of transport trays, and through an intelligent tray dispensing system the time for preparing the screening process is reduced for the passenger and thereby the overall operating efficiency is increased.

In an embodiment, this object is attained according to the invention in that the return conveyor is arranged to run on the operator side or below the screening unit and leads to a tray lift, whose exit leads to a tray transfer path running parallel to the support surface and sloping in the direction toward the support surface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
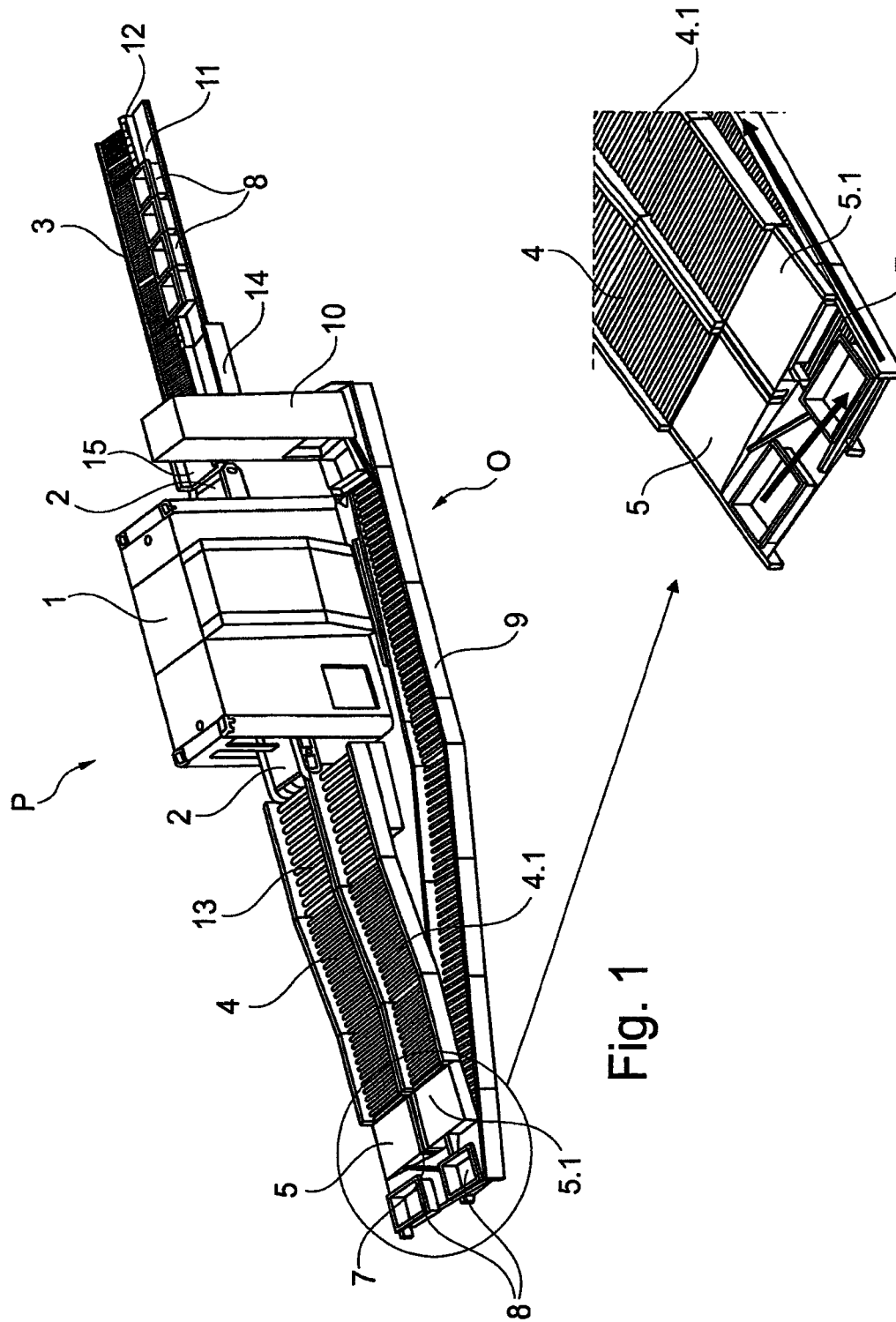
FIG. 1 shows an oblique view of a baggage screening system from an operator side.

The screening system illustrated in the figures is used to inspect carry-on baggage and other items carried by persons. It is used preferably for security checks at airports to check items carried by passengers for weapons, explosives, and other impermissible items. The screening system contains a screening unit 1, preferably an x-ray screening unit, which x-rays the carried items.

The items to be screened are conveyed through screening unit 1 on a conveyor 2, which extends through screening unit 1. Conveyor 2 is preferably a belt conveyor. At the entry side of the screening system, on the passenger side P upstream of conveyor 2 a support surface 3 is arranged, on which the items to be screened are placed and delivered to conveyor 2. Preferably, support surface 3 includes a roller section with freely rotating rollers. Between support surface 3 and conveyor 2 there is a driven belt 15 by which the items are separated from one another, so that they can be transported individually and at some distance from one another through the screening unit.

On the exit side of the screening system, conveyor 2 is adjoined by a preferably automatic discharge unit 13 and then by a roller section 4, which leads to a retrieval point 5. At retrieval point 5 a passenger 6 retrieves his screened items classified as safe.

Figure 2:
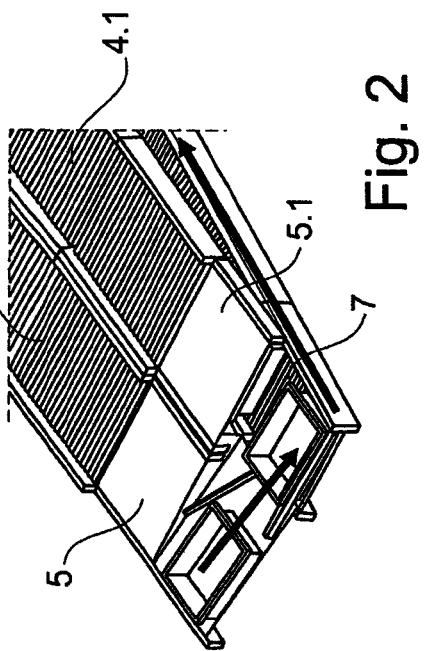
FIG. 2 shows an enlarged illustration of the end of the system in the area of the retrieval point.
Figure 3:
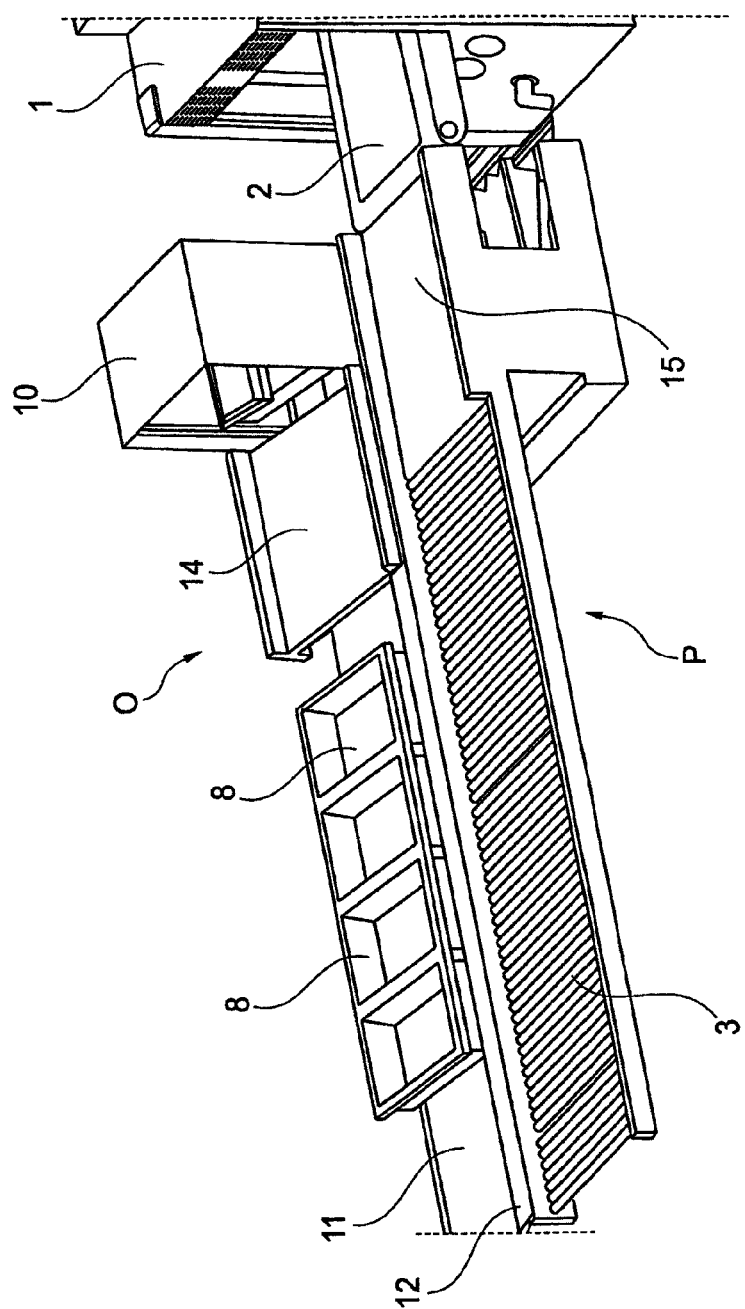
FIG. 3 shows an oblique view of the area of the support surface starting at the beginning of the system seen from the passenger side.
Figure 4:
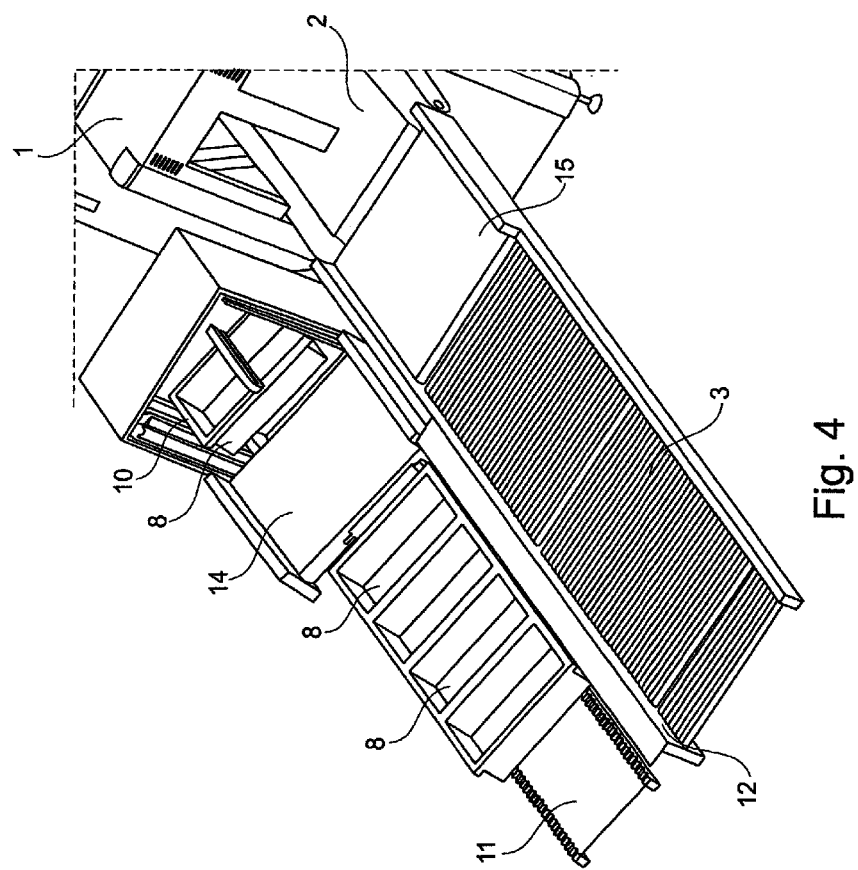
FIG. 4 shows the area in front of the screening unit in an oblique view.

A second roller section 4.1 is arranged parallel to first roller section 4 and leads to another retrieval point 5.1, which is used concurrently as the recheck point. Suspicious items can be delivered to second roller section 4.1, which conveys them to another check point, by means of discharge unit 13 that can be started automatically or manually by the operator. At the end, there is a tray pickup 7, by which the empty transport trays 8 are transferred to a tray return conveyor 9. The end area of the screening system with roller section 4, retrieval point 5, and tray pickup 7 is shown enlarged in FIG. 2.

In the exemplary embodiment, tray return conveyor 9 is arranged on the operator side O running next to the screening unit. Alternatively, it is possible to arrange the return conveyor to run directly below screening unit 1. Return conveyor 9 extends in the transport direction of the empty trays 8 to behind screening unit 1. It is configured as a roller section, whereby the roller section begins somewhat below retrieval point 5 and runs initially sloping toward the area of screening unit 1. In the area of screening unit 1, return conveyor 9 runs at the bottom, so that the operator's work is affected as little as possible. If needed for an interference-free return transport of trays 8, conveying elements of return conveyor 9 are connected to a conveyor drive. In the example, the rollers of return conveyor 9 are driven at the appropriate places. Next, return conveyor 9 leads to a tray lift 10, by which transport trays 8 are raised to the area somewhat above support surface 3. There, running parallel to support surface 3 a tray transfer path 11 is arranged, by which transport trays 8 leaving tray lift 10 are taken up.

Figure 5:
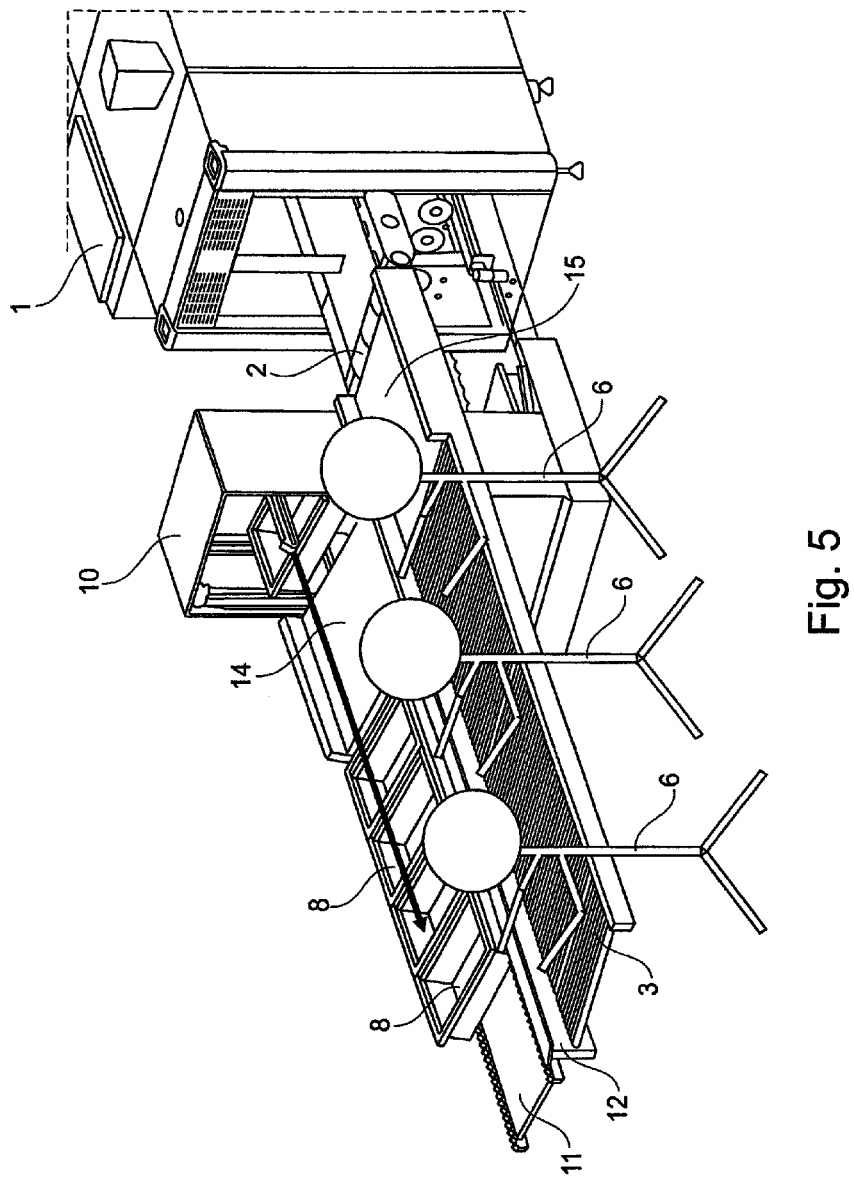
FIG. 5 shows schematically the pulling over and placement of transport trays by passengers.

Tray lift 10 contains a sliding mechanism, by which the trays are pushed from lift 10 to an adjoining driven conveyor belt 14. Conveyor belt 14 transports the arriving trays 8 to another tray transfer path 11. Tray transfer path 11 has a surface sloping in the direction toward support surface 3. It has a retaining edge 12, which includes a small strip with integrated freely rolling rollers and is not very high, so that transport trays 8 are retained only lightly and can be pulled easily by a passenger 6 onto support surface 3, as shown in FIG. 5.

The transport tray return system, shown in the figures, functions as follows:

At the start of the screening system, transport trays 8 are raised by tray lift 10 and are transferred by driven conveyor belt 14 to tray transfer path 11, which runs on the operator side O parallel to support surface 3. The heights of transfer path 11 and support surface 3 are selected so that a passenger 6 standing on passenger side P can take a tray 8 without having to bend down or stretch and can pull it to himself onto support surface 3. So that this can occur without physical effort, transfer path 11 slopes in the direction toward support surface 3. To prevent an uncontrolled slipping of trays 8 from the support surface, it has a retaining edge 12 of short height, having a small roller strip and separating it from support surface 3.

The filling of a transport tray 8 by passenger 6 with items to be screened occurs either when tray 8 is located on transfer path 11. Next the completely or partially filled tray 8 is then pushed onto support surface 3. Or alternatively, a passenger 6 can pull an empty transport tray 8 first from transfer path 11 to support surface 3 and then fill it there. Trays 8 filled with items to be screened are transferred to conveyor 2, by which they are transported for screening through screening unit 1. After the screening, conveyor 2 transfers transport trays 8 to discharge unit 14 and then, depending on the operator's assessment whether suspicious or non-suspicious, to one of the two roller sections 4 or 4.1, by which, if not suspicious, they are transported to the first retrieval point 5. There, passengers 6 remove the screened items from trays 8. The empty trays 8 are then conveyed back by return conveyor 9 via tray lift 10 again to the start side of the screening system, where they are provided on tray transfer path 11 for reuse.

Preferably, the second retrieval point 5.1 is used in addition as a recheck point. If an operator regards it necessary to open an item for a closer inspection, the item classified as suspicious by the operator after the x-ray process is taken through the automatic discharge unit 14 directly to the second section 4.1. The operator arranges for a repeated inspection at the second retrieval point 5.1, before the item may be removed by a passenger.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system for screening carry-on baggage and other items carried by persons, the system comprising:
   an x-ray screening unit;
   a conveyor configured to extend through the screening unit for conveying the items to be screened through the screening unit;
   a support surface arranged upstream of the conveyor;
   an item retrieval point arranged downstream of the conveyor;
   transport trays that are configured to be arranged on the conveyor and in which small items and articles of clothing are placed and conveyed through the screening unit for inspection; and
   a return conveyor for empty transport trays,
   wherein the return conveyor leads to a tray lift, whose exit leads to a tray transfer path running parallel to the support surface and sloping in a direction toward the support surface.

2. The screening system according to claim 1, wherein the tray transfer path has a retaining edge of short height on a side of the support surface.

3. The screening system according to claim 1, wherein the support surface is configured as a roller section.

4. The screening system according to claim 1, wherein a roller section, which slopes toward the retrieval point, is arranged between the conveyor and the retrieval point.

5. The screening system according to claim 4, wherein a second roller section, with an adjoining second retrieval point, is arranged parallel to the roller section.

6. The screening system according to claim 5, wherein a discharge unit, which delivers suspicious items to the second roller section.

7. The screening system according to claim 1, wherein the return conveyor is formed as a roller section.

8. The screening system according to claim 1, wherein conveying elements of the return conveyor are connectable to a conveyor drive.

9. The screening system according to claim 1, wherein the return conveyor is arranged running on a bottom in an area of the screening unit.

10. The screening system according to claim 1, wherein the return conveyor is arranged to run on an operator side or below the screening unit.

* * * * *